3,600,372
CARBON DISULFIDE TREATED MANNICH
CONDENSATION PRODUCTS
John H. Udelhofen, Glenwood, Ill., and Roger W.
Watson, Highland, Ind., assignors to Standard Oil Company, Chicago, Ill.
No Drawing. Filed June 4, 1968, Ser. No. 734,229
Int. Cl. C07g 17/00; C10m 1/38
U.S. Cl. 260—132
8 Claims

ABSTRACT OF THE DISCLOSURE

An ashless dispersant for lubricants which is made by reacting carbon disulfide or carbon disulfide and an alkali metal hydroxide with a Mannich condensation product.

BACKGROUND OF THE INVENTION

It has been known for many years that, with use, hydrocarbon lubricating oils deteriorate and form sludge, varnish, and corrosive substances that attack the surfaces which these oils are supposed to protect. Dispersants are blended with the oils to suspend the sludge and varnish formers, and inhibitors are added to the oils to prevent oxidation and counteract the corrosive substances. The dispersants and inhibitors should be compatible, and, preferably, they should enhance each other's performance. Illustrative of prior art dispersonts is U.S. Pat. No. 3,256,185. This patent portrays a need for improved dispersants, and disclose dispersants formed by the reaction between an alklylene polyamine, carbon disulfide, and a hydrocarbon substituted dicarboxylic acid. Although these dispersants work, their performance is not altogether satisfactory.

SUMMARY OF THE INVENTION

We have discovered novel dispersants which are formed by reacting carbon disulfide or carbon disulfide and an alkali metal hydroxide with a Mannich condensation product. The types of Mannich products particularly suited for the purpose of this invention are:

Type I.—Mannich products formed by the condensation of an alkyl substituted phenol, an alkylene polyamine, and formaldehyde; an Type II.—Mannich products formed by the condensation of an alkyl substituted phenol, an alkylene polyamine, and a hydrocarbon substituted aliphatic dicarboxylic acid or anhydride of such an acid.

Both types react with carbon disulfide or carbon disulfide and an alkali metal hydroxide to produce excellent dispersants. Surprisingly, these dispersants co-act with inhibitors to increase the anti-corrosion activity of the inhibitors.

The amounts of reactants may vary, but in general, about 0.25 to 3.0 moles of carbon disulfide are contracted with about 1 equivalent weight of the Mannich product (one equivalent weight of the Mannich product being the molecular weight of the Mannich product divided by the number of reactive nitrogen atoms present per molecule). When carbon disulfide and the alkali metal hyroxide are used, the ratio by weight of carbon disulfide to the hydroxide ranges from about 2:1 to 1:2, preferably 1:1. We prefer to use a saturated aqueous solution of the hydroxide, but a 25% by weight alkali metal hydroxide solution also works well. In general, the hydroxide is first blended with the Mannich product and then the carbon disulfide is added to the blend. Examples of suitable alkali metal hyroxides are potassium hydroxide, sodium hydroxide, and lithium hydroxide. The potassium hydroxide, however, is preferred.

In preparing Type I Mannich products, about 2 moles of a substituted phenol are reacted with about 3 moles of formaldehyde and about 2 moles of an alkylene polyamine. In preparing Type II Mannich products, about 1 mole of a substituted phenol is reacted with about 2 moles of formaldehyde and about 2 moles of an alkylene polyamine to produce an intermediate, and about 1 mole of this intermediate is then reacted with about 2 moles of a dicarboxylic aliphatic acid or acid anhydride.

Examples of suitable alkyl substituted phenols are polybutyl and polypropyl para-substituted phenols whose substituent groups are, respectively, derived from polybutenes and polypropenes. The preferred alkyl substituent contains from about 2 to 20,000 carbon atoms. In preparing Type I Mannich products, we prefer to use phenolic compounds wherein the alkyl substituent is a polybutyl radical. In preparing Type II Mannich products, we prefer to use phenolic compounds wherein the alkyl substituent is a nonyl radical.

Suitable alkylene polyamines generally come within the following formula:

$$H_2N(-\text{alkylene}-NH)_nH$$

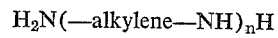

in which $n$ is an integer from about 1 to 12. The preferred alkylene polyamine is tetraethylene pentamine. Other alkylene polyamines include, for example, propylene amines, butylene amines, trimethylene amines, tetramethylene amines, and also cyclic homologues of such polyamines, for example, piperazines. Specific examples are: ethylene diamine, diethylene triamine, triethylene tetramine, propylene diamine, tripropylene tetramine, trimethylene diamine, pentaethylene tetramine, di(trimethylene) triamine, N-2-aminoethyl-piperazine, and octamethylene diamine.

Examples of suitable acids and acid anhydrides are hydrocarbon substituted succinic, malonic, glutaric, and adipic acids and anhydrides thereof. The hydrocarbon substituent should impart oil solubility to the acid or anhydride. Generally, hydrocarbon substituents having about 10 or more carbon atoms work well. Hydrocarbon substituents of the acids or anhydrides may be prepared using olefin polymers having a molecular weight between about 500 to 100,000, and they may also contain other groups, as for example, chloro, bromo, nitro, alkoxy, or phenoxy radicals.

For a more detailed description of the Type I and Type II Mannich products, refer to, respectively, U.S. application, Ser. No. 502,368, filed Oct. 22, 1965, and U.S. application, Ser. No. 591,084, filed Nov. 1, 1966.

It is a common practice to add to lubricating oils a divalent metal salt of a O,O-dihydrocarbyl ester of dithiophosphoric acid. This salt is an oxidation and corrosion inhibitor. When these inhibitors and the dispersants of this invention are added to oils, less inhibitor can be used than hitherto considered advisable. We believe this unforeseen result may be attributed to a synergistic co-action between the novel dispersants and the inhibitors.

The principal aims of this invention are:

(1) to provide an improved ashless dispersant which increases the anti-corrosion activity of inhibitors;
(2) to provide an improved ashless dispersant prepared by reacting carbon disulfide or carbon disulfide and an alkali metal hydroxide with a Mannich product; and
(3) to provide improved lubricants containing the above novel dispersants, said dispersants being compatible with inhibitors and other additives.

DESCRIPTION OF THE PREFERRED EMBODIMENTS

Other objectives and advantages will become apparent upon considering the following examples which demonstrate this invention in greater detail.

EXAMPLE I

A Type I Mannich product was first prepared by reacting about 2 moles of a polybutyl substituted phenol having a molecular weight of about 2,000 with about 3 moles of formaldehyde and about 2 moles of tetraethylene pentamine. The reaction was conducted in an SAE 5 oil and the Mannich product constituted 50% by weight of the resulting oil blend. Over a period of 10 minutes, 24 milliliters of carbon disulfide (0.4 mole) was added dropwise with stirring to 500 grams (0.4 eq.) of this blend. During the addition of the carbon disulfide to the blend, the temperature rose to about 40° C. For two hours following the addition of the carbon disulfide, the mixture was stirred and gradually heated to about 150° C., during which time hydrogen sulfide evolved. The product was then cooled to about room temperature.

EXAMPLE II

A Type Mannich product was first prepared by reacting about 1 mole of nonylphenol with about 2 moles of tetraethylene pentamine and about 2 moles of formaldehyde to form an intermediate, and then reacting about 1 mole of this intermediate with about 2 moles of polybutenyl succinic anhydride. The reaction was conducted in an SAE 5 oil and the Mannich product constituted 50% by weight of the resulting oil blend. Over a period of about 20 minutes, 18 milliliters of carbon disulfide (0.3 mole) were added dropwise with stirring to 400 grams (0.6 eq.) of this blend. During the addition of the carbon disulfide to the blend, the temperature rose to about 40° C. For two hours following the addition of the carbon disulfide, the mixture was stirred and gradually heated to about 150° C., during which time hydrogen sulfide evolved. The product was then allowed to cool to about room temperature. A bomb sulfur analysis of the product showed the presence of sulfur in the amount of 1.88% by weight.

EXAMPLE III

First, a Type II Mannich product was prepared as described in Example II. Then, 140 grams of a 50% by weight potassium hydroxide aqueous solution were added to 1,000 grams of this Mannich product. Next, over a period of about 30 minutes, 76 milliliters of carbon disulfide were added dropwise with stirring to the mixture of potassium hydroxide and the Mannich product. During the addition and mixing of the above reactions, the temperature rose to about 40° C. Because the mixture became so thick as the carbon disulfide was added, about 500 milliliters of benzene were also introduced into the mixture to reduce viscosity. The mixture was stirred overnight and allowed to cool to room temperature.

Presented below are examples of lubricating oil formulations using different dispersants. Some use the novel dispersants of this invention; others use unreacted Mannich products or prior art additives. Only a minor amount of the novel dispersant was added to the oil, usually from about 0.5 to 20 weight percent based on the total weight of the formulation, preferably from 2 to 6%. Each formulation also contained an equal amount of a zinc dialkyl dithiophosphate inhibitor. Enough of this inhibitor was added so that the zinc content of each formulation was about 0.06% by weight. Metal di-aryl or alkyl-aryl dithiophosphate salts may also be used. The corrosiveness of these different oil formulations was then measured using the Stirring Sand Corrosion Test (SSCT). The results of this test are compiled in Table I.

Lubricating material A (prior art): Parts by volume
    SAE 30 mineral oil _____ 98.0
    Reaction product of $CS_2$, polybutenyl succinic anhydride, and tetraethylene pentamine ____ 2.00
Lubricating material B:
    SAE 30 mineral oil _____ 98.0
    Additive of Example I _____ 2.00
Lubricating material C:
    SAE 30 mineral oil _____ 98.0
    Additive of Example II _____ 2.0
Lubricating material D (prior art and KOH):
    SAE 30 mineral oil _____ 95.0
    Reaction product of $CS_2$, KOH, polybutenyl succinic anhydride, and tetraethylene pentamine _____ 5.0
Lubricating material E:
    SAE 30 mineral oil _____ 95.0
    Additive of Example III _____ 5.0
Control material A′:
    SAE 30 mineral oil _____ 98.0
    Reaction product of polybutenyl succinic anhydride and tetraethylene pentamine _____ 2.00
Control material B′:
    SAE 30 mineral oil _____ 98.0
    Mannich product of Example I _____ 2.00
Control material C′:
    SAE 30 mineral oil _____ 98.0
    Mannich product of Example II _____ 2.0
Control material D′:
    SAE 30 mineral oil _____ 95.0
    Reaction product of polybutenyl succinic anhydride and tetraethylene pentamine _____ 5.0
Control material E′:
    SAE 30 mineral oil _____ 95.0
    Mannich product of Example III _____ 5.0

STIRRING SAND CORROSION TEST

The above-mentioned test measures the ability of the oil additives to inhibit corrosion of copper and/or lead containing material. In this test, a copper-lead test specimen is lightly abraded with steel wool, washed with naphtha, dried, and then weighed to the nearest milligram. This clean copper-lead test specimen is then suspended in a steel beaker, washed with a hot trisodium phosphate solution, rinsed with water and acetone, and then dried. Next, 250 grams of the oil formulation to be tested together with 50 grams of a 30–35 mesh sand and 0.625 gram of lead oxide is charged into the beaker. The lead oxide simulates lead blow-by from fuels. The beaker is then placed in a bath or on a heating block and heated to a temperature of 149° C. (±2° C.) while the contents of the beaker are stirred using a stirrer rotating at 750 r.p.m. The contents of this beaker are maintained at this temperature with stirring for 48 hours, after which the copper-lead test specimen is removed, rinsed with naphtha, dried, and weighed.

TABLE I

| (a) Lubricating material | (b) Bearing wt. loss lubricating mat. (SSCT) | (c) Control material | (d) Bearing wt. loss control material (SSCT) | (e) (d)−(b) | (f) Percent increase in anti-corrosion activity, $e/d \times 10^2 = \%$ |
|---|---|---|---|---|---|
| A (2% prior art additive) | 349 | A′ | 465 | 116 | 24.9 |
| B (2% Ex. 1 additive) | 98 | B′ | 181 | 83 | 45.9 |
| C (2% Ex. 2 additive) | 275 | C′ | 569 | 294 | 51.7 |
| D (5% prior art additive and KOH) | 334 | D′ | 490 | 156 | 32.5 |
| E (5% Ex. 3 additive) | 110 | E′ | 569 | 459 | 80.9 |

Referring to Table I, the low bearing weight loss for formulations B, C, and E in contrast to the high bearing weight loss for formulations A and D demonstrates the superiority of the dispersants of this invention. Table I also shows that the reaction between a Mannich product and carbon disulfide produces a despersant that cooperates with the inhibitor to increase the anti-corrosion activity of the inhibitor. While the reaction between carbon disulfide, the polybutenyl succinic anhydride, and the polyamine does produce a dispersant that also co-acts with the inhibitor to increase the anti-corrosion activity of the inhibitor, this increase is slight in comparison with the increase exhibited by the dispersants of this invention.

Formulations D and D' were prepared in order to contrast the effect of the hydroxide treatment of the prior art reaction product and the same hydroxide treatment of the Mannich products of this invention. Formulation D exhibits only a small increase in the anti-corrosion activity whereas formulation E exhibits a large increase in the anti-corrosion activity.

The above examples have been presented merely to illustrate the preferred embodiments of this invention. It will be apparent to those skilled in the art that these examples can be changed in many details, too numerous to conveniently list here, which do not depart from the basic principles of this invention.

What is claimed as novel and desired to be secured by Letters Patent of the United States is:

1. The reaction product of
   (A) the condensation product of an alkyl substituted phenol, an alkylene polyamine having the formula $H_2N(\text{—alkylene—}NH)_nH$ in which $n$ is an integer from about 1 to about 12, and formaldehyde, said alkyl phenol, polyamine and formaldehyde being reacted in proportions of about 2 moles of phenol to about 2 moles of polyamine to about 3 moles of formaldehyde; and
   (B) carbon disulfide or carbon disulfide and an alkali metal hydroxide, said carbon disulfide being reacted with the condensation product (A) in the proportion of about 0.25 to about 3.0 moles of carbon disulfide to about 1 equivalent weight of product (A).

2. The reaction product of claim 1 is prepared using tetraethylene pentamine.

3. The reaction product of claim 1 wherein the ratio of weight of carbon disulfide to alkali metal hydroxide ranges between about 2:1 and 1:2.

4. The reaction product of claim 3 wherein the alkali metal hydroxide is dissolved in water.

5. The reaction product of
   (A) the condensation product of an alkyl substituted phenol, an alkylene polyamine having the formula $H_2N(\text{—alkylene—}NH)_nH$ in which $n$ is an integer from about 1 to about 12, formaldehyde, and a hydrocarbon substituted aliphatic dicarboxylic acid or anhydride of said acid wherein the hydrocarbon constituent has at least about 10 carbon atoms and imparts oil-solubility to the acid or anhydride, said substituted phenol, polyamine and formaldehyde being first reacted in proportions of about 1 mole of phenol to about 2 moles of polyamine to about 2 moles of formaldehyde to form an intermediate, and then said intermediate and the substituted hydrocarbon substituted acid or acid anhydride being reacted in proportions of about 1 mole of intermediate to about 2 moles of acid or acid anhydride to form said condensation product; and
   (B) carbon disulfide or carbon disulfide and an alkali metal hydroxide, said carbon disulfide being reacted with the condensation product (A) in proportions of about 0.25 to about 3.0 moles of carbon disulfide to about 1 equivalent weight of product (A).

6. The reaction product of claim 5 is prepared using tetraethylene pentamine.

7. The reaction product of claim 5 wherein the ratio of weight of carbon disulfide to hydroxide ranges between about 2:1 and about 1:2.

8. The reaction product of claim 5 wherein the hydrocarbon substituted aliphatic dicarboxylic acid is polybutenyl succinic anhydride.

References Cited

UNITED STATES PATENTS 3,256,185   6/1966   Le Suer _____ 260—132X

CHARLES B. PARKER, Primary Examiner

D. R. PHILLIPS, Assistant Examiner

U.S. Cl. X.R.

252—42.7, 47.5